United States Patent
Weeden (10) Patent No.: US 9,348,991 B2
(45) Date of Patent: May 24, 2016

(54) USER MANAGEMENT OF AUTHENTICATION TOKENS

(75) Inventor: Shane Bradley Weeden, Paradise Point (AU)

(73) Assignee: International Business Machines Corporation, Armonk, NY (US)

( * ) Notice: Subject to any disclaimer, the term of this patent is extended or adjusted under 35 U.S.C. 154(b) by 2500 days.

(21) Appl. No.: 12/123,965

(22) Filed: May 20, 2008

(65) Prior Publication Data

US 2009/0293108 A1 Nov. 26, 2009

(51) Int. Cl.
*H04L 29/06* (2006.01)
*G06F 21/41* (2013.01)

(52) U.S. Cl.
CPC ............ *G06F 21/41* (2013.01); *H04L 63/0815* (2013.01)

(58) Field of Classification Search
CPC ............................ H04L 63/0815; G06F 21/41
USPC .............................................. 713/100; 726/6
See application file for complete search history.

(56) References Cited

U.S. PATENT DOCUMENTS

| 7,225,462 | B2 | 5/2007 | Bass et al. |
| 7,428,750 | B1 * | 9/2008 | Dunn et al. ........................ 726/8 |
| 2006/0242427 | A1 | 10/2006 | Ruzyski et al. |

FOREIGN PATENT DOCUMENTS

WO 2004004273 A1 1/2004

OTHER PUBLICATIONS

"Trusted Federated Identity Solution Architecture" (2004) by VeriSign; 16 pages; originally downloaded from http://www.hitrust.com.hk/whitepaper/2.8/whitepaper_Trusted_Federated_Identity_Solution_Architecture.pdf.*

* cited by examiner

*Primary Examiner* — Dao Ho
(74) *Attorney, Agent, or Firm* — Yee & Associates, P.C.; Gail Zarick (57) ABSTRACT

A computer implemented method, a computer program product, and a data processing system manage a set of federated log-in authentications at secure web sites. A client logs into a security context using a first alias from a list of existing federated single sign-on authentication aliases associated with an account. Responsive to logging into the security context, the client can receive the list of existing federated single sign-on authentication aliases. The client can then manage the list of authentication aliases.

6 Claims, 5 Drawing Sheets

USER MANAGEMENT OF AUTHENTICATION TOKENS

BACKGROUND OF THE INVENTION

1. Field of the Invention

The present invention relates generally to a computer implemented method, a data processing system, and a computer program product. More specifically, the present invention relates to the management of a set of federated logins.

2. Background Description

Control of access to web applications and resources is required to allow customers, partners and employees to access needed resources while effectively preventing unauthorized access to those same resources. However, user databases and access policies are often disjointed, requiring a user and administrators to jump through many login hoops before accessing the needed resources.

Federated Identity Management effectively solves many of the access problems. Local applications with their own identification standards can provide remote applications with security assertions containing user attributes. When an unregistered user seeks access to a resource within a certain security context, the local applications can search other federated repositories to authenticate the unregistered users.

However, a Federated Identification System introduces several additional problems. Federated single sign-on environments introduce privacy issues for a user whose only method of authentication to a website is via a tightly coupled federation relationship, i.e., the identity provider to the service provider. The identity provider in these relationships has the ability to track when a user visits a particular service provider. Additionally, if the infrastructure or provider of one authentication technique is offline, a user has no recourse for logging into the same account. Finally, a user may have different types of user-agent devices such as mobile telephones, personal digital assistants, and internet browsers. Any one of these devices may only support a subset of authentication credential protocols. Thus a user is often forced to maintain a variety of accounts in order to access each of the needed services.

BRIEF SUMMARY OF THE INVENTION

A computer implemented method, a computer program product, and a data processing system are provided for managing a set of federated log-in authentications at secure web sites. A client logs into a security context using a first alias from a list of existing federated single sign-on authentication aliases associated with an account. Responsive to logging into the security context, the client can receive the list of existing federated single sign-on authentication aliases. The client can then manage the list of authentication aliases.

DETAILED DESCRIPTION OF THE PREFERRED EMBODIMENT

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, and radio-frequency.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
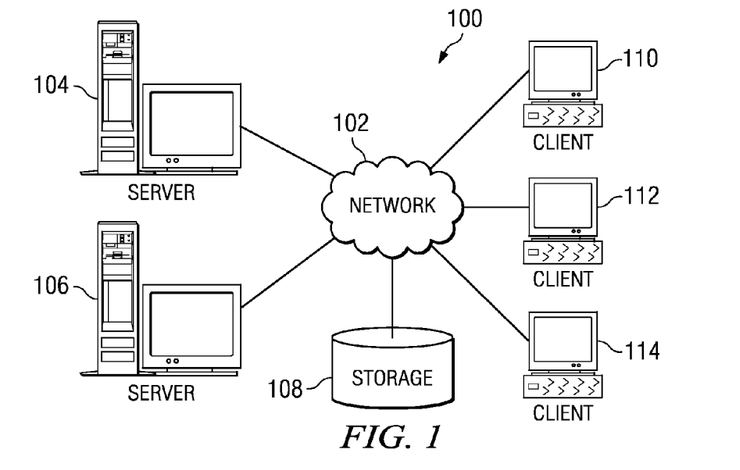
FIG. 1 depicts a pictorial representation of a network of data processing systems in which illustrative embodiments may be implemented.
Figure 2:
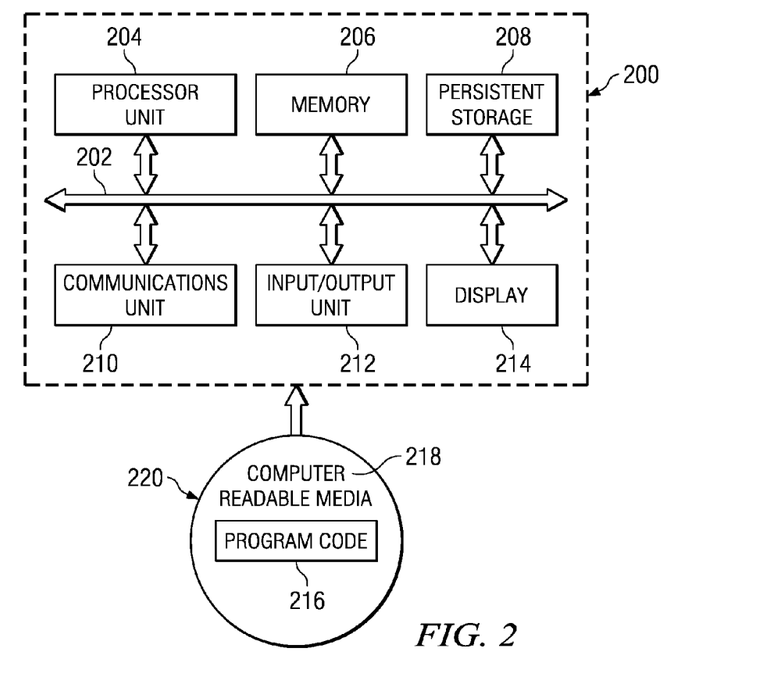
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments present a method for user-driven, self-maintained authentication credentials other than passwords in a federated single sign-on transaction. The method is particularly applicable (but not limited to) to user-centric identity authentication techniques like Cardspace® and OpenID®. This method can be combined with known methods, such as user self-registration in a federated single sign-on transaction, to provide a complete user authentication account and credential lifecycle management for non-password credentials. The method also provides end-users with a degree of privacy that extends beyond partner-to-partner federated models like SAML and Liberty, even if those models were used for initial account creation.

Once an account is established by an end-user, the end-user is provided with facilities to link new authentication credentials, i.e., proposed aliases, and unlink existing authentication credentials to and from their account, i.e., existing aliases, via user-self service. To link new authentication credentials, i.e., a new alias, the user of an existing account first authenticates to the relying party site using an existing mechanism, such as an already established alias. The user then presents the new authentication credentials which contain the new alias to be linked to the existing account. Thus, while already logged into a site, the user effectively performs a second login, presenting the new credentials containing a proposed alias. The system then creates an association between the new proposed alias contained in the new credentials and the user's account.

To unlink authentication credentials, i.e., an existing alias, the user first authenticates to the system using an existing authentication technique such as an already established alias. A list of currently linked aliases associated with the user's account is presented to the authenticated user for selection. The user can then select one of the currently linked aliases to be marked for deletion. The reference between the selected alias and the user's account is then deleted or disabled in the system's records.

If at any time a user feels that one of the authentication credentials associated with their alias may be compromised, they need only login to their account, ensure that they have at least one other valid non-compromised linked credential, and then delete the compromised credential from the account. The types of authentication credentials do not need to be the same—in particular it is often useful if they are different as that allows users more than one way to access their account.

Figure 3:
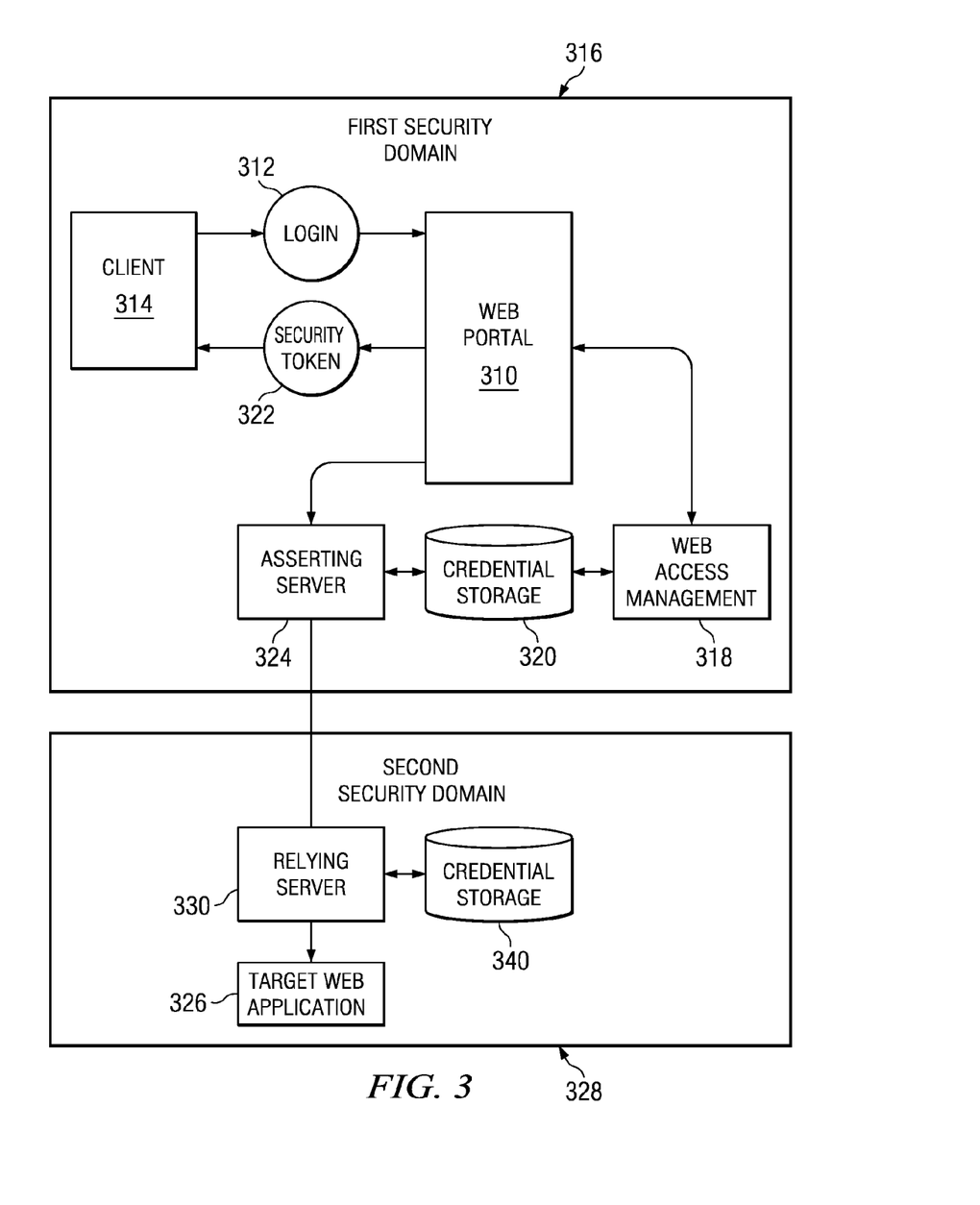
FIG. 3 is a diagram of a federated identity validation according to an illustrative embodiment.

Referring now to FIG. 3, a diagram of a federated identity validation is shown according to an illustrative embodiment.

Web portal 310 receives login 312 from client 314. Web portal 310 is a data processing system, such as server 106 and 104 of FIG. 1, and functions as a point of access for Client 314 to information on a network, such as network 102 of FIG. 1. Web portal 310 provides client 314 access to web services and applications within the first security domain 316. First security domain 316 is a collection of services and applications operating under a single security authority. First security domain 316 is comprised of the procedures and processes that protect information and information resources from unauthorized access, use, disclosure, disruption, modification, or destruction, which helps to provides confidentiality, integrity, and availability of information resources.

In addition to the username/password authentication at the first security domain, other forms of login credentials other than username and password may also be used. Other forms of login credentials can include for example, such as, but not limited to, biometrics, one-time passwords, certificates or even a federated login from another security domain.

Web portal 310 then uses web access management 318 to authenticate client 314 within first security domain 316. Login 312 is compared with credential storage 320 to validate the identification and password of login 312. Credential storage 320 is a data structure containing login names and passwords for users registered within first security domain 316.

Upon identifying a name and password within credential storage 320 that matches login 312, web access management 318 returns security token 322 to client 314. Security token 322 is a cookie, or other identifier placed on client 314. Security token 322 allows client 314 to use web services and applications within first security domain 316.

When the user of client 314 attempts to access target web application 326 within second security domain 328, client 314 is redirected to asserting server 324. Asserting server 324 is a Federation Identity Server, and can be server 104 and 106 of FIG. 1. Asserting server 324 creates an assertion by retrieving and validating security token 322. Optionally, asserting server 324 can also create an assertion by accessing credential storage 320 to retrieve and map user identifiers and attributes for client 314. The assertion can be a Security Assertion Markup Language (SAML) assertion or any other form of token mutually agreeable to the first security domain and second security domain.

Asserting server 324 forwards the assertion to relying server 330 within second security domain 328. This can be done using any agreeable communications protocol, which may or may not be defined in an existing standard. Relying server 330 is a Federation Identity Server, and can be server 104 and 106 of FIG. 1. Relying server 330 performs the appropriate identity processing to validate the assertion from asserting server 324. Optionally, relying server 330 can also access credential storage 340 to retrieve and map user identifiers and attributes for client 314.

Relying server 330 then creates and returns security token 322 to client 314. Security token 322 is a cookie, or other identifier placed on client 314. Security token 322 allows client 314 to use web services and applications within second security domain 328.

Figure 4:
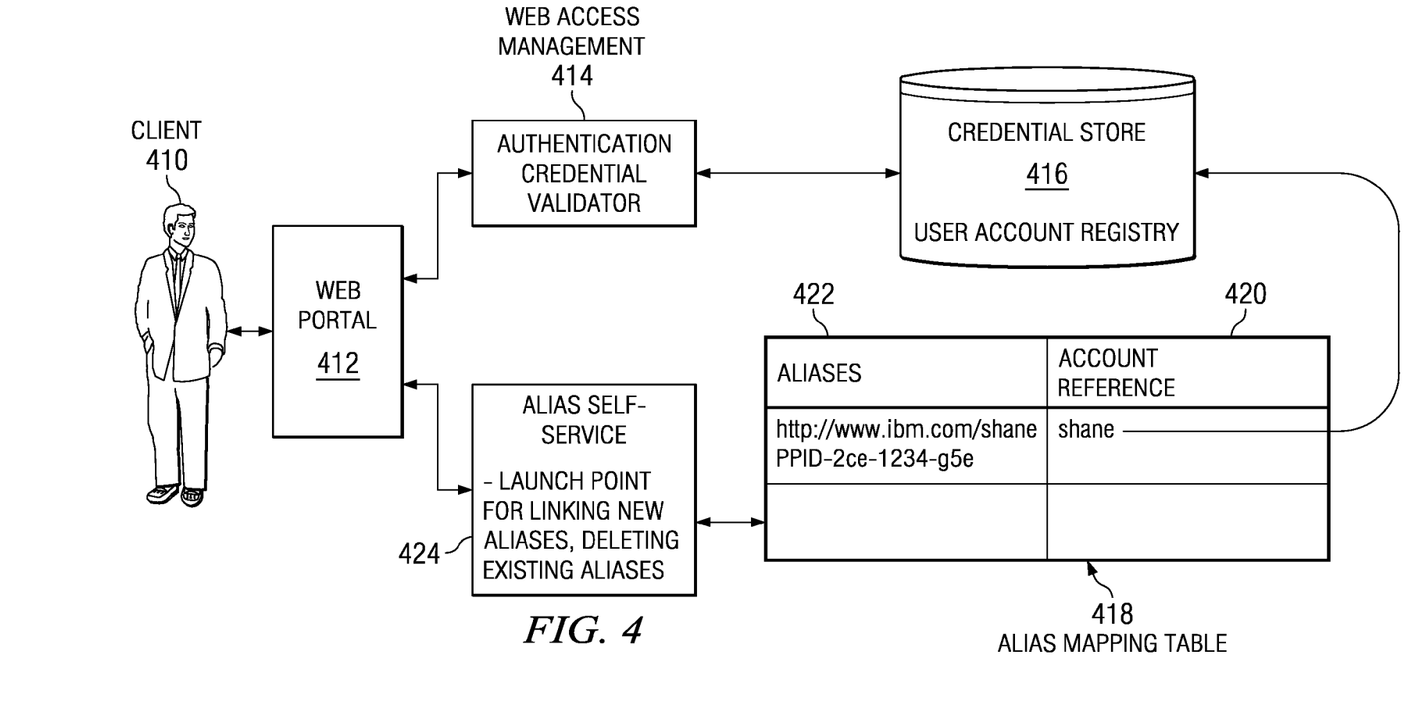
FIG. 4 is a diagram of an alias management system for federated identity validation according to an illustrative embodiment.

Referring now to FIG. 4, a diagram of an alias management system for federated identity validation is shown according to an illustrative embodiment.

Client 410, which can be client 314 of FIG. 3, logs into web portal 412, which is web portal 310 of FIG. 3. Web portal 412 then uses web access management 414 to authenticate client 410 within a current security domain. Login information from client 410, which can be login 312 of FIG. 3, is compared with credential storage 416 to validate the login information.

Alias mapping table 418 is a data structure within credential storage 416 containing at least account reference 420 and corresponding aliases 422 which can be derived from authentication credentials. Alias mapping table 418 is a "many-to-one" map of user aliases to an actual user account.

Alias self service 424 is a user-interface based software application. Alias self service 424 allows a user at client 410 to view the currently linked aliases, such as corresponding aliases 422. Alias self service 424 allows the user at client 410 to launch operations, delete existing aliases, and add new aliases to an alias mapping table, such as alias mapping table 418, associated with the user's account.

Figure 5:
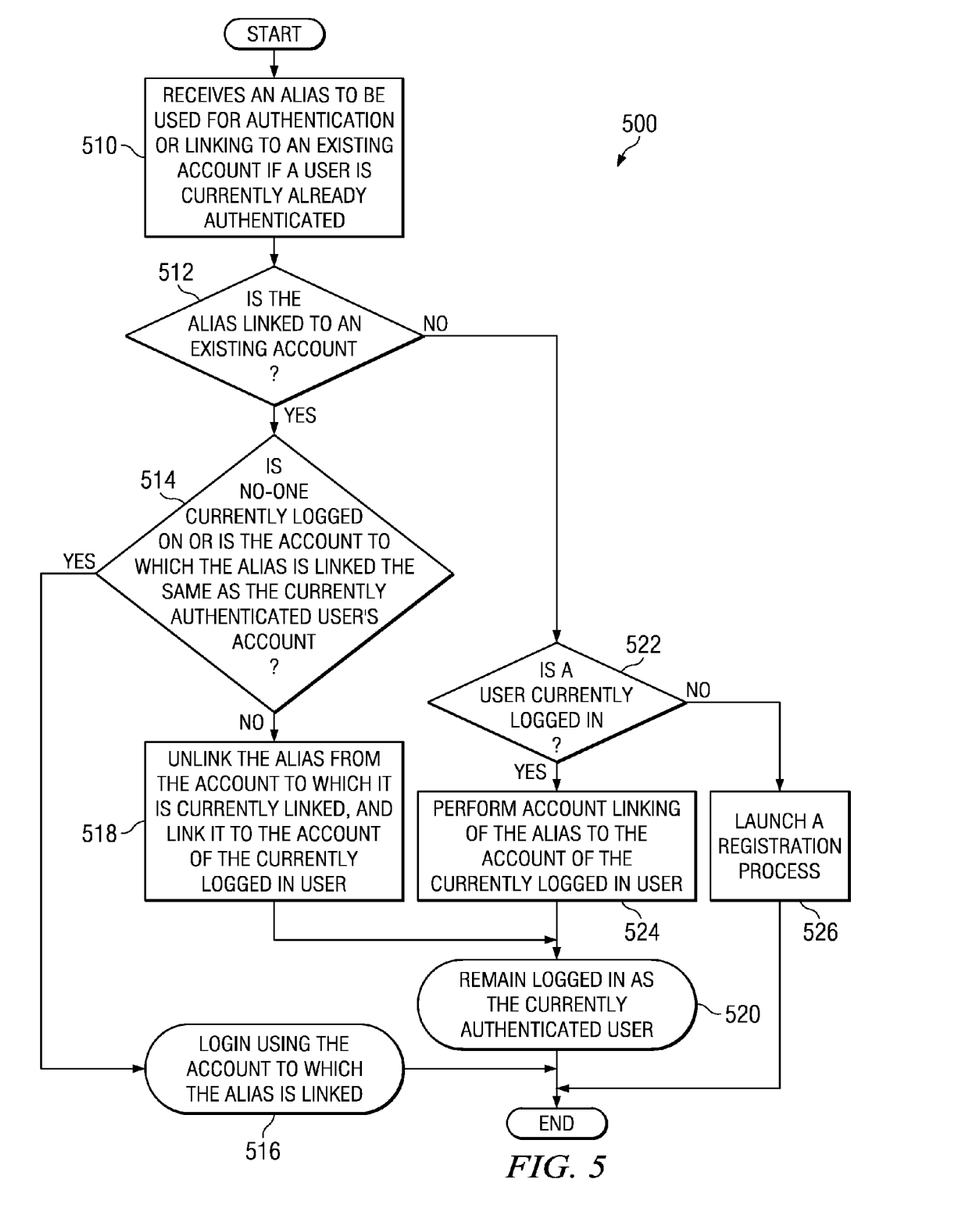
FIG. 5 is a flowchart depicting a process for the processing of an alias linking request according to an illustrative embodiment.

Referring now to FIG. 5, a flowchart depicting a process for the processing of an alias linking request is shown according to an illustrative embodiment. Process 500 is a software process, executing on a web access management such as web access management 414 of FIG. 4.

The current user may or may not be authenticated to the system. Process 500 begins by receiving an authentication credential containing alias to either login to an existing account or to link a new alias to an existing account (step 510). This alias is to be used to login to an existing account, if the end user is not currently authenticated. This alias is to be used to link a new alias to an existing account, if the end user is currently authenticated.

Process 500 then determines whether the alias is currently associated with an existing account (step 512). That is, process 500 compares the alias with the list of stored aliases within the credential storage, such as credential storage 416 of FIG. 4. Process 500 can parse aliases, such as corresponding aliases 422 of FIG. 4, contained within the credential storage to make the determination of whether the alias is linked to an existing account.

Responsive to determining that the alias is linked to an account ("yes" at step 512), process 500 then determines if no one is currently authenticated to the system, or the account of the user currently authenticated matches the account to which the alias is linked (step 514). Responsive to determining that either no-one is currently authenticated to the system or the account for the alias matches the account of the user currently authenticated ("yes" at step 514), process 500 logs the user into a security context using the account associated with the alias (step 516), with the process terminating thereafter.

Returning now to step 514, responsive to determining that a user is currently authenticated to the system and the alias is associated with a different account to that user, ("no" at step 514), process 500 unlinks the alias from its current account, and then links the proposed alias to the account for the currently authenticated user (step 518). The process therefore simply unlinks the proposed alias from its old account and links the proposed alias to the account of the user who has now been determined to own the authentication credentials associated with that alias. Process 500 then remains logged into the security context using the currently authenticated account (step 520), with the process terminating thereafter.

Returning now to step 512, responsive to determining that the alias is not associated with an existing account ("no" at step 512), process 500 determines whether a user is currently authenticated to the system (step 522).

Responsive to determining that a user is currently authenticated to the system ("yes" at step 522), process 500 performs an account linking of the alias to the account of the currently authenticated user (step 524). The alias is linked to the account of the currently authenticated user by adding the proposed alias to an alias mapping table associated with the account of the currently authenticated user. The alias mapping table can be alias mapping table 418 of FIG. 4.

Responsive to performing the account linking of the alias, process 500 then remains logged in as the currently authenticated user (step 520), with the process terminating thereafter.

Returning now to step 522, responsive to determining that there is no currently authenticated user ("no" at step 522), process 500 processes the indication to add a new account via a self-registration request, and launches a registration process (step 526), with the process terminating thereafter. Because no-one is currently logged in, and the presented alias is not associated with an existing account, the alias is unverified. The user can therefore be registered by known e-mail registration and verification processes.

Figure 6:
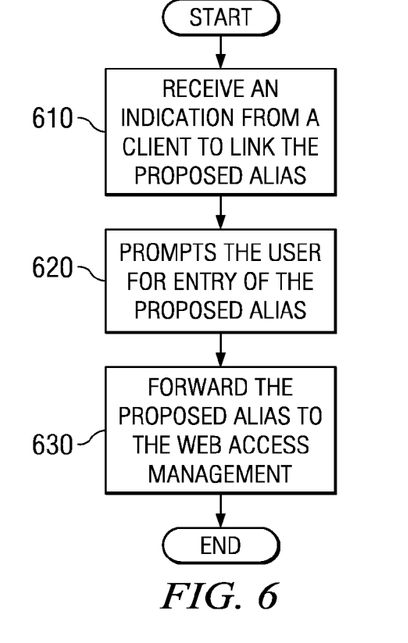
FIG. 6 is a flowchart depicting a process for receiving a request to link a new alias to an existing account according to an illustrative embodiment.

Referring now to FIG. 6, a flowchart depicting a process for receiving a request to link a new alias to an existing account is shown according to an illustrative embodiment. Process 600 is a software process, executing on a software component, such as alias self service 424 of FIG. 4. A user making a request to add a proposed alias has previously logged into the current security domain using an existing alias associated with that user's account.

Process 600 begins by receiving an indication from a client to link a proposed alias (step 610). Responsive to receiving the indication from the client to link the proposed alias, process 600 prompts the user for entry of the proposed alias (step 620). Process 600 then receives the proposed alias, and forwards the proposed alias to the web access management (step 630), with the process terminating thereafter. The web access management can be web access management 318 of FIG. 3. The web access management can then perform a validation of the proposed alias, and link the proposed alias to the user's account, according to process 500 of FIG. 5.

Figure 7:
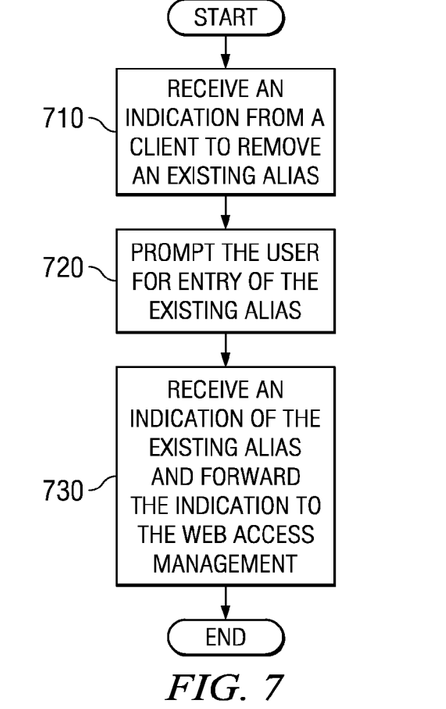
FIG. 7 is a flowchart depicting a process for receiving a request to remove an existing alias from an existing account according to an illustrative embodiment.

Referring now to FIG. 7, a flowchart depicting a process for receiving a request to remove an existing alias from an existing account is shown according to an illustrative embodiment. Process 700 is a software process, executing on a software component, such as alias self service 424 of FIG. 4. A user making a request to remove a proposed alias has previously logged into the current security domain.

Process 700 begins by receiving an indication from a client to remove an existing alias (step 710). Responsive to receiving the indication from the client to remove the proposed alias, process 700 prompts the user for entry of the alias to remove (step 720). Process 700 then receives an indication of the alias to remove, and forwards the indication to the web access management (step 730), with the process terminating thereafter. The web access management can be web access management 318 of FIG. 3. The web access management can then remove the existing alias by removing the existing alias from an alias mapping table associated with the user, such as alias mapping table 418 of FIG. 4.

Figure 8:
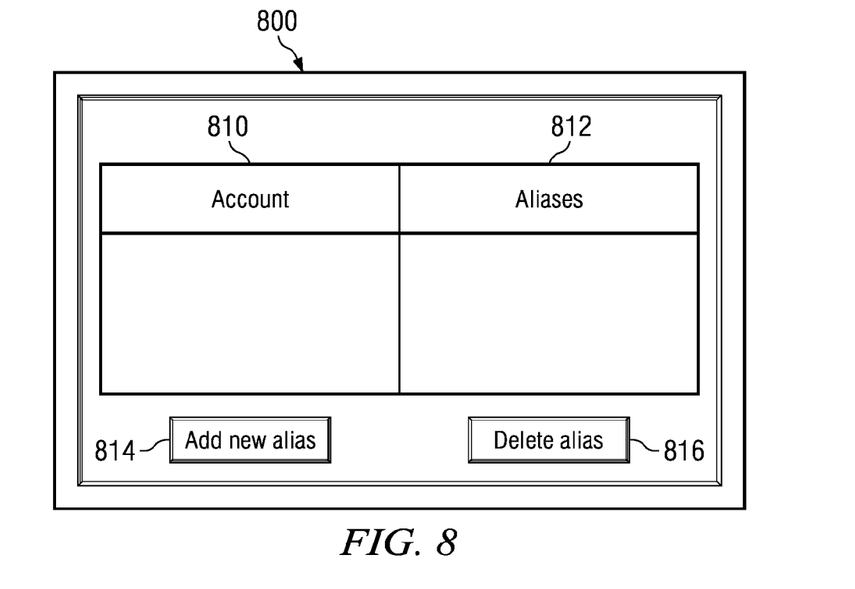
FIG. 8 is an illustrative screenshot of a graphical user-interface for a software application to manage aliases within an alias mapping table according to an illustrative embodiment.

Referring now to FIG. 8, an illustrative screenshot of a graphical user-interface for a software application to manage aliases within an alias mapping table is shown according to an illustrative embodiment. Screenshot 800 can be a screen shot of alias self service 424 of FIG. 4.

Screenshot 800 shows account 810. Account 810 is a user's account registered with a web portal or web services provider. Associated with account 810 are aliases 812. Aliases 812 are those aliases which are currently linked to account 810.

Screenshot 800 also depicts interactive buttons "add new alias" 814 and "delete alias" 816. By manipulating "add new alias" 814, a user can indicate a proposed alias to be linked to the user's account. Manipulating "add new alias" 814 may call a command line interface, or some other input, into which the user can input the proposed alias.

By manipulating "delete alias" 814, a user can indicate an existing alias, such as one of those listed in aliases 812, to be removed from the user's account. Manipulating "delete alias" 816 may prompt the user to indicate which of aliases 812 the user wishes to remove. Manipulating "delete alias" 816 may also prompt the user of a confirmation of the removal of the existing alias, especially if the existing alias is the only alias currently linked to the user's account.

Thus, the embodiments described herein present a method for user-driven, self-maintained authentication credentials other than passwords in a federated single sign-on transaction. The method is particularly applicable (but not limited) to user-centric identity authentication techniques like Cardspace and OpenID. This method can be combined with known methods, such as user self-registration in a federated single sign-on transaction, to provide complete user authentication account and credential lifecycle management for non-password credentials. The method also provides end-users with a degree of privacy that extends beyond partner-to-partner federated models like SAML and Liberty, even if those models were used for initial account creation.

Once an account, and an authenticated session logged in to that account using an existing alias, is established by an end-user, the end-user is provided with facilities to link new authentication credentials, i.e., proposed aliases, and unlink existing authentication credentials to and from their account, i.e., existing aliases, via user-self service. To link new authentication credentials, i.e., a new alias, the user of an existing account presents the new authentication credentials to the authentication site. Thus, while already logged into a site, the user effectively performs a second login, presenting the new credentials. The system then creates an association between the new credentials and the user's account.

To unlink authentication credentials, i.e., an existing alias, the list of aliases linked to the currently authenticated account is presented to the authenticated user for selection, and the reference between the selected alias and the user's account is deleted or disabled in the system's records.

If at any time a user feels that one of their authentication credentials may be compromised, they need only login to their account, ensure that they have at least one other valid non-compromised linked alias, and then delete the alias associated with the compromised credential from the account. The types of authentication credentials do not need to be the same—in particular it is often useful if they are different as that allows users more than one way to access their account.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and digital video disk (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, such as cable modems and Ethernet cards, are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing a set of federated log-in authentications at secure web sites, the method comprising:
   logging into a security context using a first alias from a list of existing federated single sign-on authentication aliases associated with an account;
   responsive to logging into the security context, receiving the list of existing federated single sign-on authentication aliases; and
   managing the list of authentication aliases, wherein the step of managing the list of authentication aliases comprises:
   receiving an indication of a second alias from the list of existing federated single sign-on authentication aliases;
   responsive to receiving the indication of the second alias, disassociating the second alias from the account; and
   responsive to disassociating the second alias from the account, associating the second alias to another account associated with other authentication aliases.

2. The computer implemented method of claim 1, wherein the step of disassociating the second alias from the account comprises deleting the second alias from the list of existing federated single sign-on authentication aliases associated with the account.

3. A computer program product comprising:
   a non-transitory computer readable storage medium having computer usable program code stored thereon for managing a set of federated log-in authentications at secure web sites, the computer program product comprising:
   computer usable program code for logging into a security context using a first alias from a list of existing federated single sign-on authentication aliases associated with an account;
   computer usable program code, responsive to logging into the security context, for receiving the list of existing federated single sign-on authentication aliases; and
   computer usable program code for managing the list of authentication aliases, wherein the computer usable program code for managing the list of authentication aliases comprises:
   computer usable program code for receiving an indication of a second alias from the list of existing federated single sign-on authentication aliases;
   computer usable program code, responsive to receiving the indication of the second alias, for disassociating the second alias from the account; and
   computer usable program code, responsive to disassociating the second alias from the account, for associating the second alias to another account associated with other authentication aliases.

4. The computer program product of claim 3, wherein the computer usable program code for disassociating the second alias from the account comprises computer usable program code for deleting the second alias from the list of existing federated single sign-on authentication aliases associated with the account.

5. A data processing system comprising:
   a bus;
   a communications unit connected to the bus;
   a storage device connected to the bus, wherein the storage device includes computer usable program code for managing a set of federated log-in authentications at secure web sites; and
   a processor unit connected to the bus, wherein the processor unit executes the computer usable program code to log into a security context using a non-password based first alias from a list of existing federated single sign-on authentication aliases associated with an account, responsive to logging into the security context, to receive the list of existing federated single sign-on authentication aliases, and to manage the list of authentication aliases, wherein the processor executing the computer usable program code to manage the list of authentication aliases further comprises the processor executing the computer usable program code:
   to receive an indication of a second alias from the list of existing federated single sign-on authentication aliases;
   responsive to receiving the indication of the second alias, to disassociate the second alias from the account; and responsive to disassociating the second alias from the account, to associate the second alias to another account associated with other authentication aliases.

6. The data processing system of claim 5, the processor executing the computer usable program code to disassociate the second alias from the account comprises the processor executing the computer usable program code to delete the second alias from the list of existing federated single sign-on authentication aliases associated with the account.

\* \* \* \* \*